(12) United States Patent
Kobayashi et al.

(10) Patent No.: US 11,307,215 B2
(45) Date of Patent: Apr. 19, 2022

(54) ACCELERATION SENSOR CORE UNIT, AND METHOD FOR PREVENTING DEFLECTION OF A BASE BOARD ON WHICH ACCELERATION SENSOR IS MOUNTED

(71) Applicant: IMV CORPORATION, Osaka (JP)

(72) Inventors: Toshiyuki Kobayashi, Osaka (JP); Takao Kawahira, Osaka (JP)

(73) Assignee: IMV CORPORATION, Osaka (JP)

( * ) Notice: Subject to any disclaimer, the term of this patent is extended or adjusted under 35 U.S.C. 154(b) by 82 days.

(21) Appl. No.: 16/682,162

(22) Filed: Nov. 13, 2019

(65) Prior Publication Data

US 2020/0371129 A1 Nov. 26, 2020

(30) Foreign Application Priority Data

May 22, 2019 (JP) .............................. JP2019-095640

(51) Int. Cl.
*G01P 15/08* (2006.01)
*G01P 1/02* (2006.01)
*G01P 15/18* (2013.01)

(52) U.S. Cl.
CPC ............... *G01P 15/08* (2013.01); *G01P 1/02* (2013.01); *G01P 1/023* (2013.01); *G01P 15/18* (2013.01)

(58) Field of Classification Search
CPC .. G01P 15/08; G01P 15/18; G01P 1/02; G01P 1/023
See application file for complete search history.

(56) References Cited

U.S. PATENT DOCUMENTS

| 5,345,823 | A | * | 9/1994 | Reidemeister | .......... G01P 1/023 361/280 |
| 5,546,644 | A | * | 8/1996 | Kakizaki | ................. G01P 1/023 29/25.35 |
| 5,668,316 | A | * | 9/1997 | Iwai | .................... G01C 19/5663 73/493 |
| 5,686,711 | A | * | 11/1997 | Yamamoto | .............. G01P 15/08 200/61.48 |
| 6,098,460 | A | * | 8/2000 | Otsuchi | ................. G01L 5/0052 310/331 |
| 6,233,153 | B1 | * | 5/2001 | Baur | ...................... H05K 5/006 361/752 |
| 6,644,117 | B1 | * | 11/2003 | Kueck | ................. F16K 99/0015 73/488 |

(Continued)

FOREIGN PATENT DOCUMENTS

WO WO 2015/145489 10/2015

*Primary Examiner* — Helen C Kwok
(74) *Attorney, Agent, or Firm* — Jason H. Vick; Sheridan Ross, PC

(57) ABSTRACT

An acceleration sensor core unit 1 includes a circuit board 3 and metallic plates 4, 5. The circuit board 3 is made of an epoxy resin, and an acceleration sensor 11 for detecting vibration acceleration in an arrow 105 direction is mounted thereon. The circuit board 3 is sandwiched between the metallic plates 4, 5. Ring-shaped metallic spacers 7a to 7c and ring-shaped metallic spacers 8a to 8c are respectively interposed between the circuit board 3 and the metallic plate 4 and between the circuit board 3 and the metallic plate 5. The circuit board 3 is screwed to each of the metallic plates 4, 5 at three positions. Thus, it is possible to reliably fix the circuit board 3 to the metallic plates 4, 5 with a small attachment space. In this way, rigidity as the acceleration sensor core unit 1 can be secured.

20 Claims, 5 Drawing Sheets

1 : ACCELERATION SENSOR CORE UNIT
3 : CIRCUIT BOARD
4 : METALLIC PLATE
5 : METALLIC PLATE
7a to 7c : SPACER
8a to 8c : SPACER

(56) References Cited

U.S. PATENT DOCUMENTS

| | | | |
|---|---|---|---|
| 2002/0007677 A1* | 1/2002 | Coates | G01C 9/06 73/514.16 |
| 2004/0150144 A1* | 8/2004 | Goepfert | F16F 15/08 267/136 |
| 2007/0074570 A1* | 4/2007 | Braman | F16F 15/08 73/504.14 |
| 2007/0089511 A1* | 4/2007 | Sasaki | G01P 1/023 73/514.16 |
| 2007/0113702 A1* | 5/2007 | Braman | F16F 15/126 74/574.4 |
| 2009/0100929 A1* | 4/2009 | Ohkoshi | G01C 19/56 73/504.04 |
| 2010/0257932 A1* | 10/2010 | Braman | G01C 21/16 73/493 |
| 2012/0073371 A1* | 3/2012 | Theuss | G01P 15/123 73/514.31 |
| 2012/0090393 A1* | 4/2012 | Montanya Silvestre | G01P 15/0891 73/514.18 |
| 2013/0319118 A1* | 12/2013 | Deng | G01P 15/09 73/514.32 |
| 2014/0224014 A1* | 8/2014 | Wang | G01C 21/16 73/504.04 |
| 2016/0234604 A1* | 8/2016 | Saxena | H04R 1/04 |
| 2019/0256348 A1* | 8/2019 | Mitchell | B81B 7/0058 |

\* cited by examiner

1 : ACCELERATION SENSOR CORE UNIT
3 : CIRCUIT BOARD
4 : METALLIC PLATE
5 : METALLIC PLATE
7a to 7c : SPACER
8a to 8c : SPACER 4a to 4c : THROUGH HOLE 5a to 5c : TAPPED HOLE

21 : CASING
21a : BODY
21b : LID
21c : HOLE
21d : ATTACHMENT HOLE

A-A SECTION

B-B SECTION

ACCELERATION SENSOR CORE UNIT, AND METHOD FOR PREVENTING DEFLECTION OF A BASE BOARD ON WHICH ACCELERATION SENSOR IS MOUNTED

CROSS REFERENCE TO RELATED APPLICATIONS

This application claims the benefit under 35 U.S.C. 119(a) to Japanese Patent Application No. JP 2019-095640, filed May 22, 2019, the entire disclosure of which is incorporated herein by reference in its entirety.

TECHNICAL FIELD

The present invention relates to an acceleration sensor and, in particular, to prevention of deflection of a base board on which an acceleration sensor is mounted.

BACKGROUND ART

Patent Document 1 (WO 2015/145489) discloses a sensor unit, in which an acceleration sensor (hereinafter referred to as a MEMS acceleration sensor) manufactured in a MEMS process (semiconductor microfabrication) is stored in a casing. The sensor unit is a three-axis acceleration sensor.

As such a MEMS acceleration sensor, a small-sized acceleration sensor specialized in detecting acceleration in one axis direction has been known. The inventor has invented a core unit, in which this small-sized acceleration sensor is mounted on a circuit board and stored in a casing. The core unit will be described by using FIG. 1.

As illustrated in FIG. 1A, a core unit 112 has a circuit board 101 and a stand 103. As illustrated in FIG. 1B, the stand 103 has an L-shaped structure, and the circuit board 101 is fixed to a lateral surface thereof by screws at four positions. A small-sized acceleration sensor 104 is fixed to a portion near an attachment screw on a surface of the circuit board 101 opposing the stand 103.

Here, the small-sized acceleration sensor 104 detects vibration acceleration in an arrow 105 direction.

The core unit 112 is stored in a casing (not illustrated). Thus, a degree of freedom in an attachment position is increased.

However, it is understood that, when the inventor conducted an experiment, the core unit 112 illustrated in FIG. 1 could not demonstrate detection accuracy of the small-sized sensor itself.

The present invention has a purpose of solving the above problem and providing an acceleration sensor core unit with a high degree of accuracy.

Features, the other purposes, applications, effects, and the like of the present invention will become apparent with reference to an embodiment and the drawings.

SUMMARY OF THE INVENTION

An acceleration sensor core unit includes: a base board having a surface on which an acceleration sensor is mounted; a first reinforcing plate that is fixed to the surface side of the base board via a space forming member so as to suppress deflection of the base board; and a second reinforcing plate that is fixed to a back surface side of the base board via a space forming member so as to suppress the deflection of the base board.

Therefore, it is possible to suppress deflection of the base board and to detect acceleration with a high degree of accuracy.

DETAILED DESCRIPTION

A description will be made on an embodiment of the present invention with reference to the drawings.

Figure 2A:
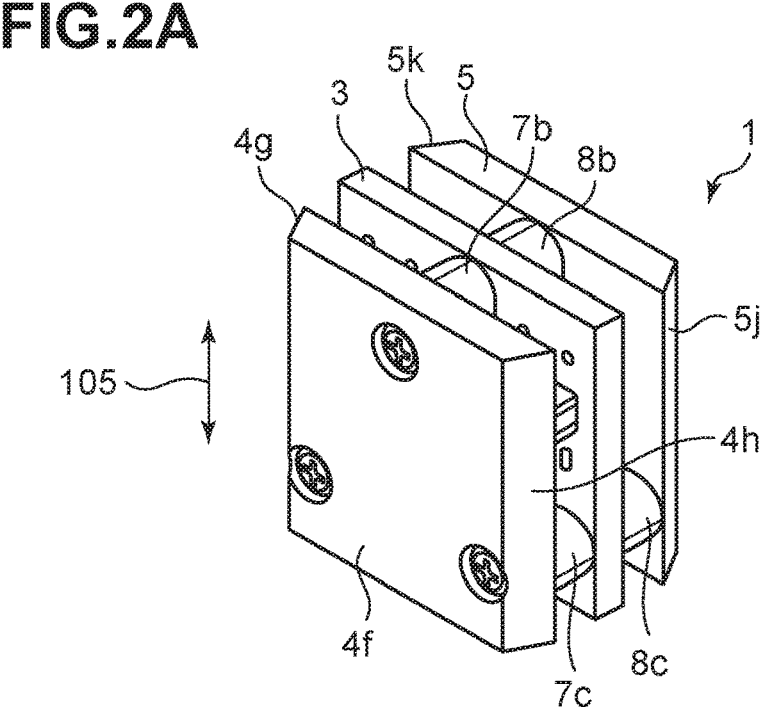
FIG. 2A to 2C include views illustrating a structure of an acceleration sensor core unit 1.

FIG. 2A illustrates an acceleration sensor core unit 1 according to the embodiment of the present invention. The acceleration sensor core unit 1 includes a circuit board 3 as a base board, a metallic plates 4, 5, and spacers 7a to 7c, 8a to 8c.

Figure 3:
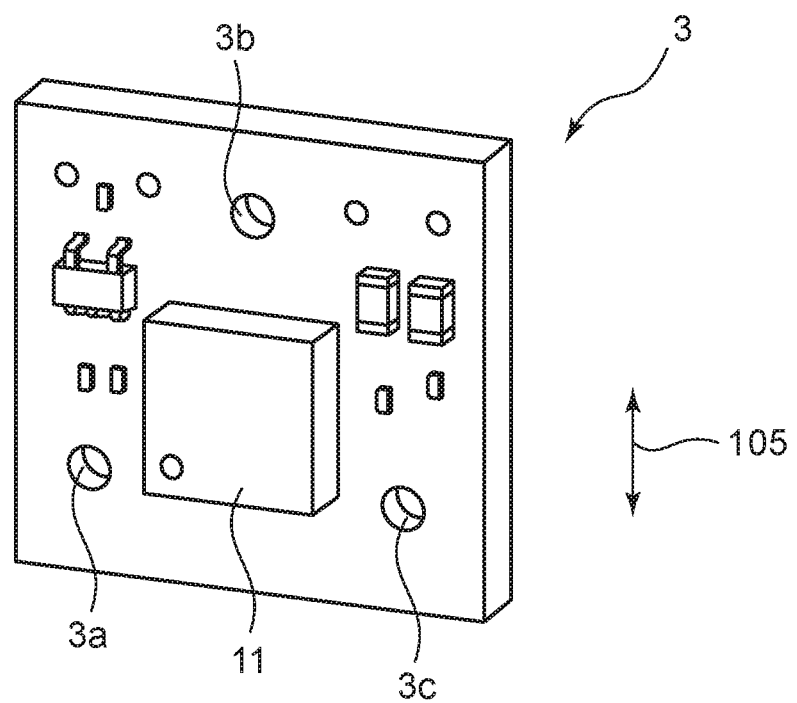
FIG. 3 is a perspective view of a circuit board 3.

The circuit board 3 is made of a glass epoxy resin, and as illustrated in FIG. 3, an acceleration sensor 11 and various electronic components are mounted on a surface thereon. In addition, through holes 3a to 3c are provided at three positions. The acceleration sensor 11 detects vibration acceleration in an arrow 105 direction.

Figure 2B:
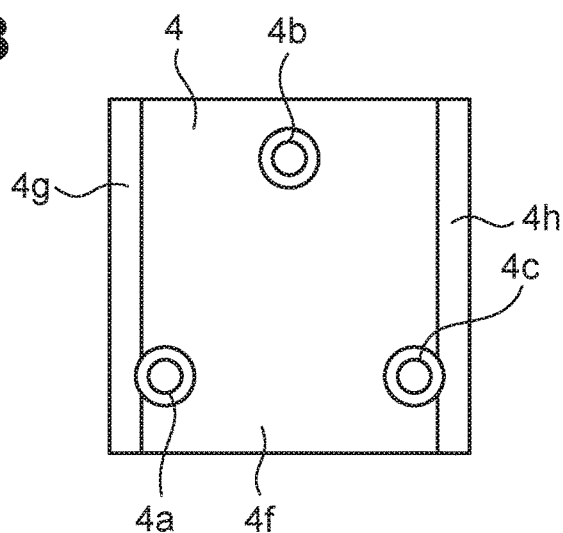
Figure 2C:
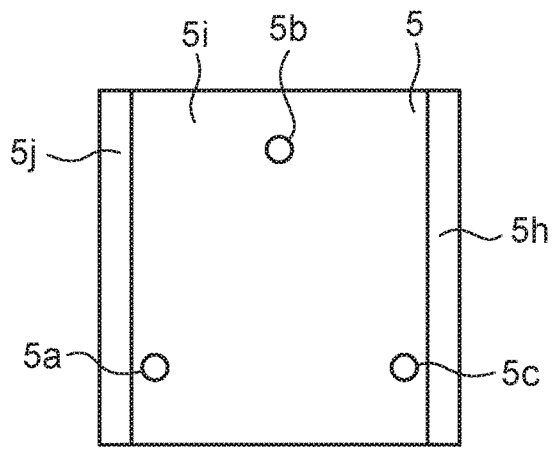

As illustrated in FIG. 2A, the circuit board 3 is sandwiched between the metallic plates 4, 5. The metallic plates 4, 5 are illustrated in FIGS. 2B and 2C, respectively. As illustrated in FIG. 2B, the metallic plate 4 is provided with through holes 4a to 4c subjected to counter boring. As illustrated in FIG. 2C, the metallic plate 5 is provided with tapped holes 5a to 5c.

The ring-shaped metallic spacers 7a to 7c are interposed between the circuit board 3 and the metallic plate 4. Similarly, the ring-shaped metallic plates 8a to 8c are interposed between the circuit board 3 and the metallic plate 5. An inner diameter of each of the ring-shaped spacers 7a to 7c, 8a to 8c is slightly larger than that of each of the through holes 3a to 3c of the circuit board 3.

Since the circuit board 3 is screwed to each of the metallic plates 4, 5 at the three positions in the acceleration sensor core unit 1, it is possible to reliably fix the circuit board 3 to the metallic plates 4, 5 with a small attachment space. In this way, the circuit board 3 and the metallic plates 4, 5 are easily and reliably maintained in parallel.

Note that, while the circuit board 3 can be screwed to each of the metallic plates 4, 5 at four positions, there are such problems that the attachment space is enlarged and tightness of the screw tightening is unstable. In the case where such problems can be avoided, the number of the screwed positions is not limited.

Figure 4A:
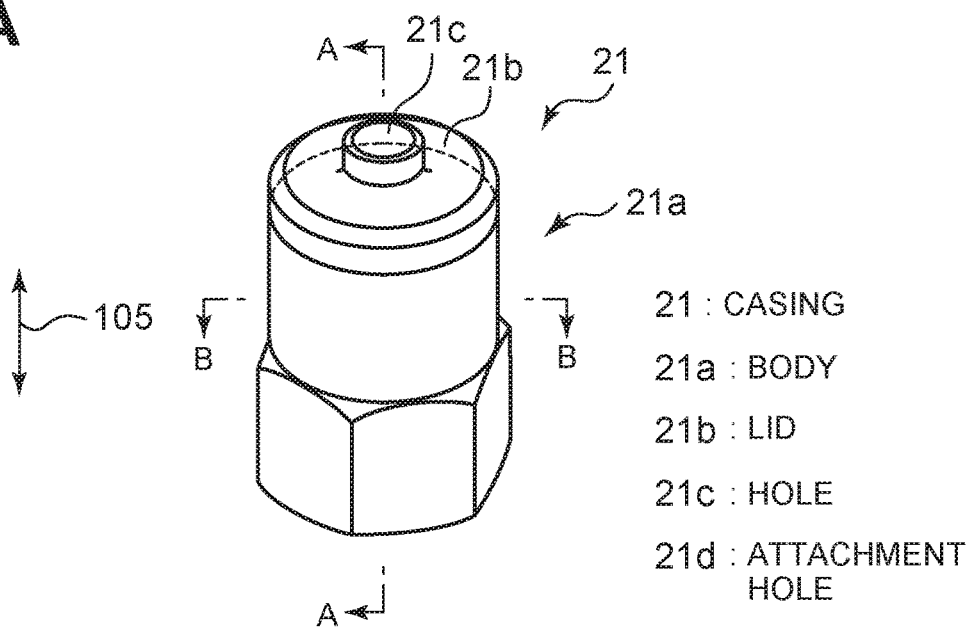
FIG. 4A to 4C include views illustrating a structure of a casing 21.
Figure 4B:
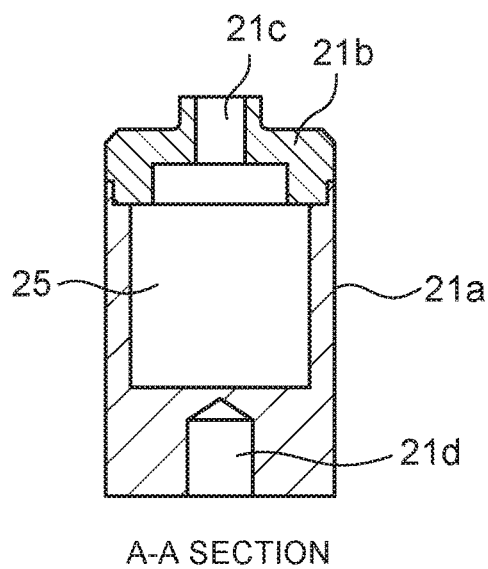
Figure 4C:
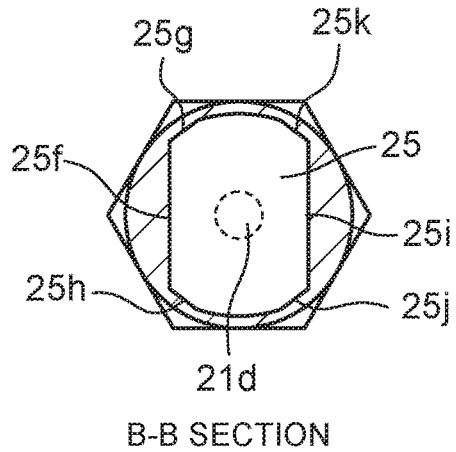

The acceleration sensor core unit 1 is stored in a casing 21 (see FIG. 4A). As illustrated in FIG. 4A, the casing 21 is constructed of a body 21a and a lid 21b. As illustrated in FIG. 4B, the body 21a is formed with a space 25 so as to be able to store the acceleration sensor core unit 1 therein. As illustrated in FIG. 4C, the space 25 has such a shape that an outer shape of the acceleration sensor core unit 1 can be fitted thereto. More specifically, in a state without being rattled, a surface 25f is held by a surface 4f of the metallic plate 4, a surface 25i is held by a surface 5i of the metallic plate 5, a surface 25g is held by a surface 4g of the metallic plate 4, a surface 25h is held by a surface 4h of the metallic plate 4, a surface 25k is held by a surface 5k of the metallic plate 5, and a surface 25j is held by a surface 5j of the metallic plate 5, respectively.

An attachment hole 21d of the casing 21 is formed with a tap, and the tap is used to fix the casing to an attachment surface.

Wires (not illustrated) are connected to the circuit board 3 of the acceleration sensor core unit 1 via the hole 21d provided in the lid 21b. In this way, the measured vibration acceleration is retrieved to the outside of the casing.

In this embodiment, both sides of the circuit board 3 are reinforced by the metallic plates 4, 5. Thus, even when the vibration acceleration at a high frequency (10 KHz or higher) is detected, deflection of the circuit board is suppressed. Therefore, it is possible to detect the vibration acceleration with a high degree of accuracy.

Figure 1A:
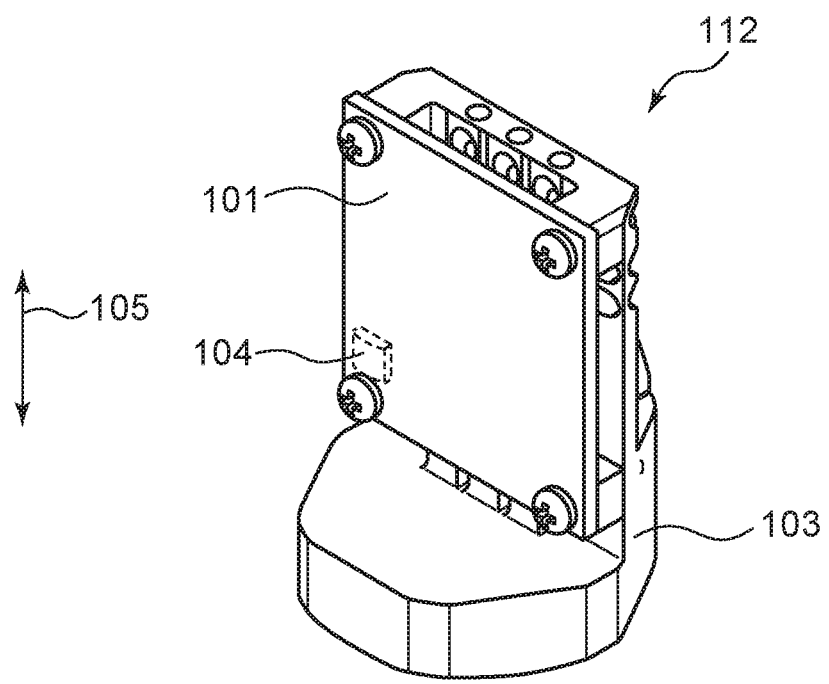
FIGS. 1A and 1B include schematic views of an acceleration sensor core unit formed for a test.
Figure 1B:
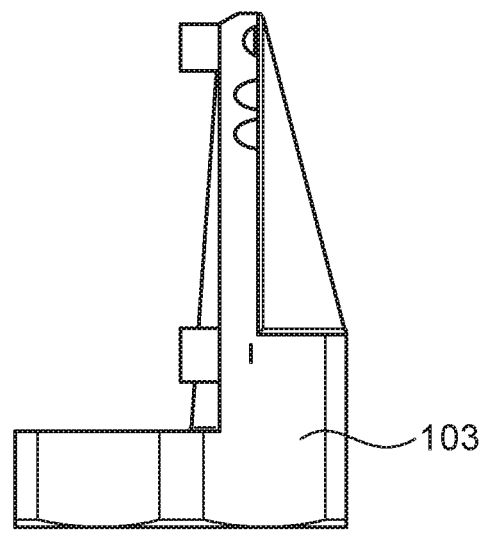
Figure 5:
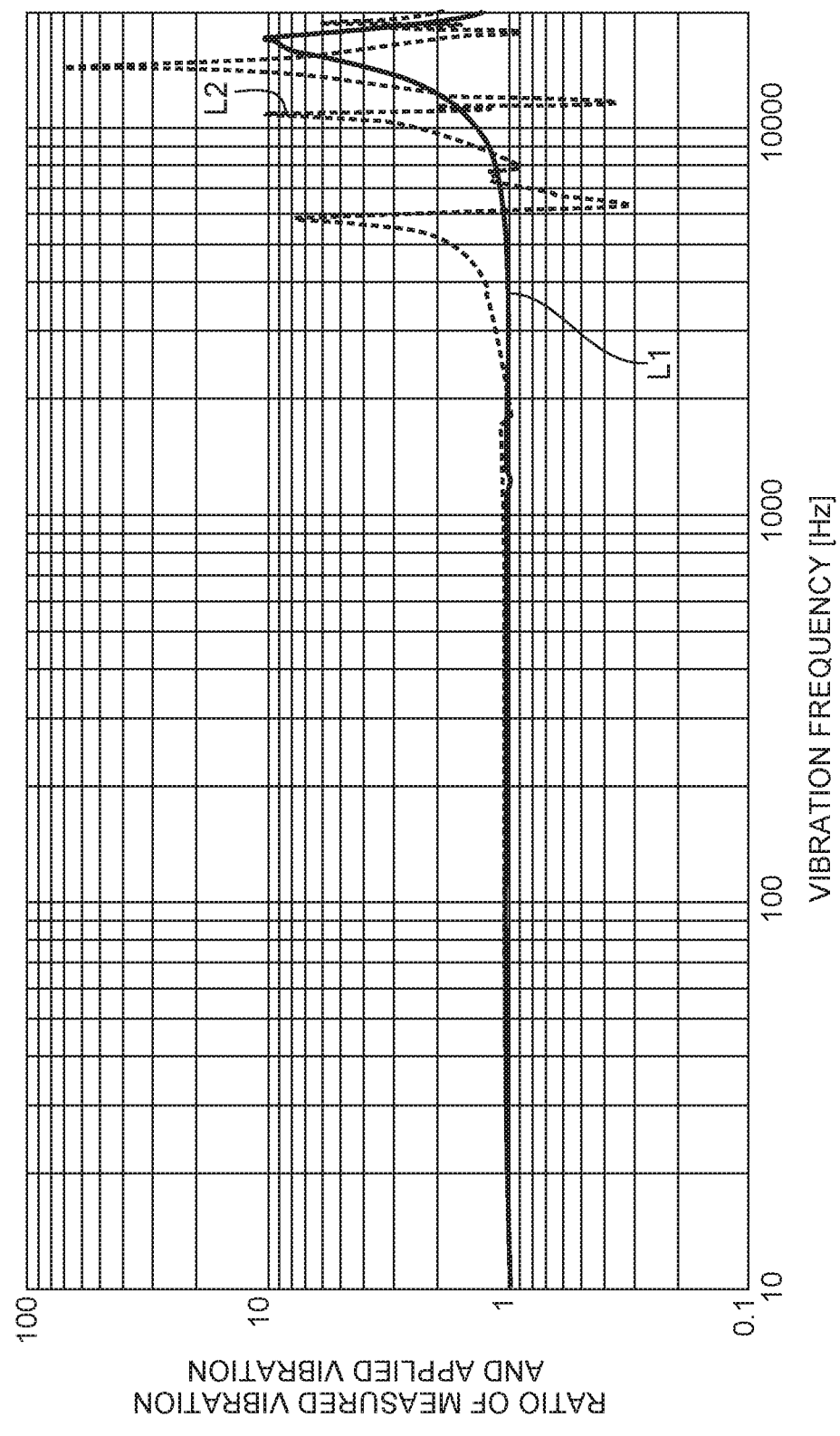
FIG. 5 is a frequency characteristic graph illustrating an effect by the present invention.

FIG. 5 illustrates a vibration frequency characteristic in the acceleration sensor core unit 1. A curve L1 represents the vibration frequency characteristic in the acceleration sensor core unit 1, and a curve L2 represents a vibration frequency characteristic in the core unit 112 illustrated in FIG. 1. As illustrated in the drawing, fluctuations occur to the core unit 112 in FIG. 1 at 1 KHz or higher. Meanwhile, the sufficient frequency characteristic can be obtained by the acceleration sensor core unit 1.

Note that a highly rigid circuit board (for example, ceramic) can also be used simply to improve the accuracy. However, the ceramic circuit board is expensive, and the casing has to be made of a similar material. This is because there is a risk of cracking or a clearance with different thermal expansion coefficients. In this embodiment, the casing and reinforcing plates can be constructed of the same metallic material.

In addition, it is considered to prevent deflection of the circuit board 3 by bonding the circuit board 3 and the metallic plate 5 of this specification without interposing the spacers 8 therebetween. However, in such a case, due to different thermal expansion rates, the circuit board 3 and the metallic plate 5 are possibly peeled off of each other when being expanded. In this embodiment, the circuit board 3 is fixed to and held by the metallic plates 4, 5 via the spacers 7 and 8, respectively. Thus, a problem of such expansion can also be avoided.

In the present specification, the description has been made on the case where the vibration acceleration is parallel with the circuit board 3 and a bottom surface of the casing faces a vertical direction. However, when a sensor, a detection direction of which differs, is used, it is possible to detect the vibration acceleration in a lateral direction of the casing.

Alternatively, a sensor that detects the acceleration not in the one-axis direction but in two or three-axis direction may be adopted.

The description has been made so far on the present embodiment as the preferred embodiment. However, each term is not used to limit the invention but rather used for the description. Therefore, each of the terms can be changed within the accompanying drawings without departing from the scope and the spirit of the present invention.

In the acceleration sensor core unit, the first and second reinforcing plates are parallel with the base board. Therefore, in the case where parallelism between each of the reinforcing plates and a casing can be secured when the acceleration sensor core unit is stored in the casing, the sensor can be set in parallel with the casing.

In the acceleration sensor core unit, the first and second reinforcing plates are each fixed to the base board at three positions. Therefore, the first and second reinforcing plates and the base board can reliably be integrated even with a small space.

In the acceleration sensor core unit, the sensor detects acceleration in a parallel direction with the base board. Therefore, it is possible to reliably detect vibration acceleration in a parallel direction with the base board.

An acceleration sensor pick-up further includes a casing that stores the acceleration sensor core unit. Therefore, a sensor can be attached to a position where attachment of the sensor itself is difficult.

A method for preventing deflection of a base board on which an acceleration sensor is mounted includes: fixing a first reinforcing plate, which suppresses the deflection of the base board, to the surface side of the base board via a space forming member; and fixing a second reinforcing plate, which suppresses the deflection of the base board, to a back surface side of the base board via a space forming member. Therefore, it is possible to prevent the deflection of the base board on which the acceleration sensor is mounted.

DESCRIPTION OF REFERENCE NUMERALS AND SYMBOLS

1: Acceleration sensor core unit
3: Circuit board
4: Metallic plate
5: Metallic plate
21: Casing
7a to 7c: Spacer
8a to 8c: Spacer

The invention claimed is:

1. An acceleration sensor core unit configured to detect vibration acceleration at frequencies of 10 KHz or higher comprising:
   a base board having a surface on which an acceleration sensor is mounted;
   a first metallic reinforcing plate that is rigidly fixed to the surface of the base board via at least one metallic space forming member so as to suppress a deflection of the base board at frequencies of 10 KHz or higher; and
   a second metallic reinforcing plate that is rigidly fixed to a back surface of the base board via at least one metallic space forming member so as to suppress the deflection of the base board at frequencies of 10 KHz or higher, wherein the base board is located between the first metallic reinforcing plate and the second metallic reinforcing plate.

2. The acceleration sensor core unit according to claim 1, wherein
   the first and second reinforcing plates are parallel with the base board.

3. The acceleration sensor core unit according to claim 1, wherein
   the first and second reinforcing plates are each fixed to the base board at three positions.

4. The acceleration sensor core unit according to claim 2, wherein
   the first and second reinforcing plates are each fixed to the base board at three positions.

5. The acceleration sensor core unit according to claim 1, wherein
   the sensor detects acceleration in a parallel direction with the base board.

6. The acceleration sensor core unit according to claim 2, wherein
the sensor detects acceleration in a parallel direction with the base board.

7. The acceleration sensor core unit according to claim 3, wherein
the sensor detects acceleration in a parallel direction with the base board.

8. The acceleration sensor core unit according to claim 4, wherein
the sensor detects acceleration in a parallel direction with the base board.

9. An acceleration sensor pick-up comprising:
the acceleration sensor core unit according to claim 1; and
a casing that stores the acceleration sensor core.

10. The acceleration sensor pick-up according to claim 9, wherein
the first and second reinforcing plates are parallel with the base board.

11. The acceleration sensor pick-up according to claim 9, wherein
the first and second reinforcing plates are each fixed to the base board at three positions.

12. The acceleration sensor pick-up according to claim 10, wherein
the first and second reinforcing plates are each fixed to the base board at three positions.

13. The acceleration sensor pick-up according to claim 9, wherein
the sensor detects acceleration in a parallel direction with the base board.

14. The acceleration sensor pick-up according to claim 10, wherein
the sensor detects acceleration in a parallel direction with the base board.

15. The acceleration sensor pick-up according to claim 11, wherein
the sensor detects acceleration in a parallel direction with the base board.

16. The acceleration sensor pick-up according to claim 12, wherein
the sensor detects acceleration in a parallel direction with the base board.

17. A deflection prevention method for preventing a deflection of a base board having a surface on which an acceleration sensor is mounted, the sensor detecting vibration acceleration at frequency of 10 KHz or higher, the deflection prevention method comprising:
rigidly fixing a first ridged metallic reinforcing plate, which suppresses the deflection of the base board at frequency of 10 KHz or higher, to the surface of the base board via at least one space forming member; and
rigidly fixing a second ridged metallic reinforcing plate, which suppresses the deflection of the base board at frequency of 10 KHz or higher, to a back surface of the base board via at least one space forming member such that the base board is between the first ridged metallic reinforcing plate and the second ridged metallic reinforcing plate.

18. The deflection prevention method according to claim 17, wherein
the first and second reinforcing plates are parallel with the base board.

19. The deflection prevention method according to claim 17, wherein
the first and second reinforcing plates are each fixed to the base board at three positions.

20. The deflection prevention method according to claim 17, wherein
the sensor detects acceleration in a parallel direction with the base board.

* * * * *